United States Patent [19]
Link et al.

[11] Patent Number: 5,377,803
[45] Date of Patent: Jan. 3, 1995

[54] PRESSURE PLATE ARRANGEMENT FOR A MOTOR VEHICLE FRICTION CLUTCH

[75] Inventors: Achim Link, Schweinfurt; Reinhold Weidinger, Unterspiesheim; Heiko Schulz-Andres, Poppenhausen; Klaus Elsner, Schweinfurt; Rainer Wiedmann, Hambach; Ralf Nenninger, Werneck; Michael Weiss, Dittelbrunn, all of Germany

[73] Assignee: Fichtel & Sachs AG, Schweinfurt, Germany

[21] Appl. No.: 57,087

[22] Filed: May 4, 1993

[30] Foreign Application Priority Data

May 6, 1992 [DE] Germany ............................ 4214996
Mar. 4, 1993 [DE] Germany ............................ 4306688

[51] Int. Cl.⁶ ..................... F16D 13/50; F16D 13/75
[52] U.S. Cl. .................... 192/111 A; 192/70.25; 192/89.23; 192/89.24
[58] Field of Search ............. 192/70.25, 111 A, 89.23, 192/89.24

[56] References Cited

U.S. PATENT DOCUMENTS

| | | | |
|---|---|---|---|
| 4,466,524 | 8/1984 | Lane | 192/70.25 |
| 4,924,991 | 5/1990 | Takeuchi | 192/111 A |

FOREIGN PATENT DOCUMENTS

| | | | |
|---|---|---|---|
| 2599446 | 12/1987 | France | 192/111 A |
| 2606477 | 5/1988 | France | 192/111 A |
| 0129129 | 6/1991 | Japan | 192/111 A |
| 0134318 | 6/1991 | Japan | 192/111 A |
| 2004000 | 3/1979 | United Kingdom . | |
| 2022729 | 12/1979 | United Kingdom . | |
| 2176256 | 12/1986 | United Kingdom . | |

Primary Examiner—Rodney H. Bonck
Attorney, Agent, or Firm—Brumbaugh, Graves, Donohue & Raymond

[57] ABSTRACT

A pressure plate arrangement (1) for a friction clutch of a motor vehicle is proposed, wherein an adjustment device (19), which automatically compensates for the wear of the friction linings (21), is disposed in the support path between a diaphragm spring (13) and a pressure plate (11), stressed against a flywheel (1) by the diaphragm spring (13) via friction linings (21) of a clutch disk (23). The adjustment device (19) has a pressure path compensating member (31), for example in the form of a radially resilient cone-shaped ring, which automatically compensates for possible play between the diaphragm spring (13) and the pressure plate (11). Distributed in the circumferential direction, a plurality of play transfer devices (37) is axially movably guided and arrested (for example by self-locking). The play transfer devices (37) rest against the flywheel (1) of the clutch housing (9) fixedly connected therewith and have levers (43) which limit the maximal wear compensation path of the compensating member (31). In this manner a wear compensation, which is independent of possible wear compensation mechanism of a hydraulic clutch disengagement system, takes place within the clutch. In addition, the diaphragm spring (13) of the proposed pressure plate arrangement retains its original position in relation to the flywheel (1) or the clutch housing (9), regardless of a possible wear compensation.

26 Claims, 6 Drawing Sheets

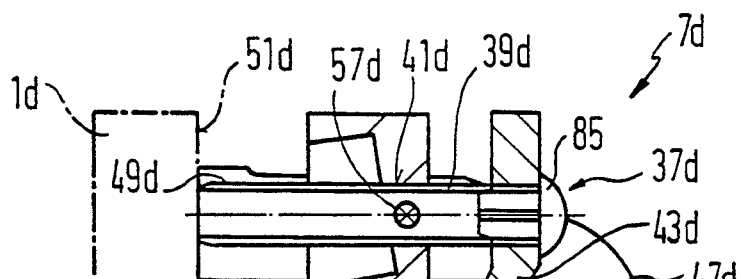
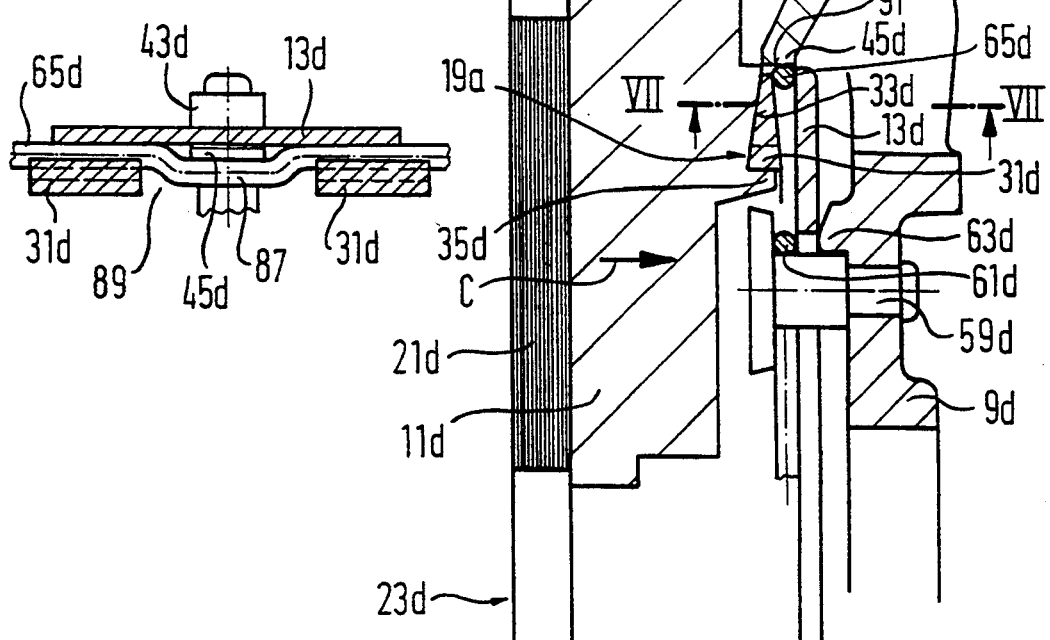

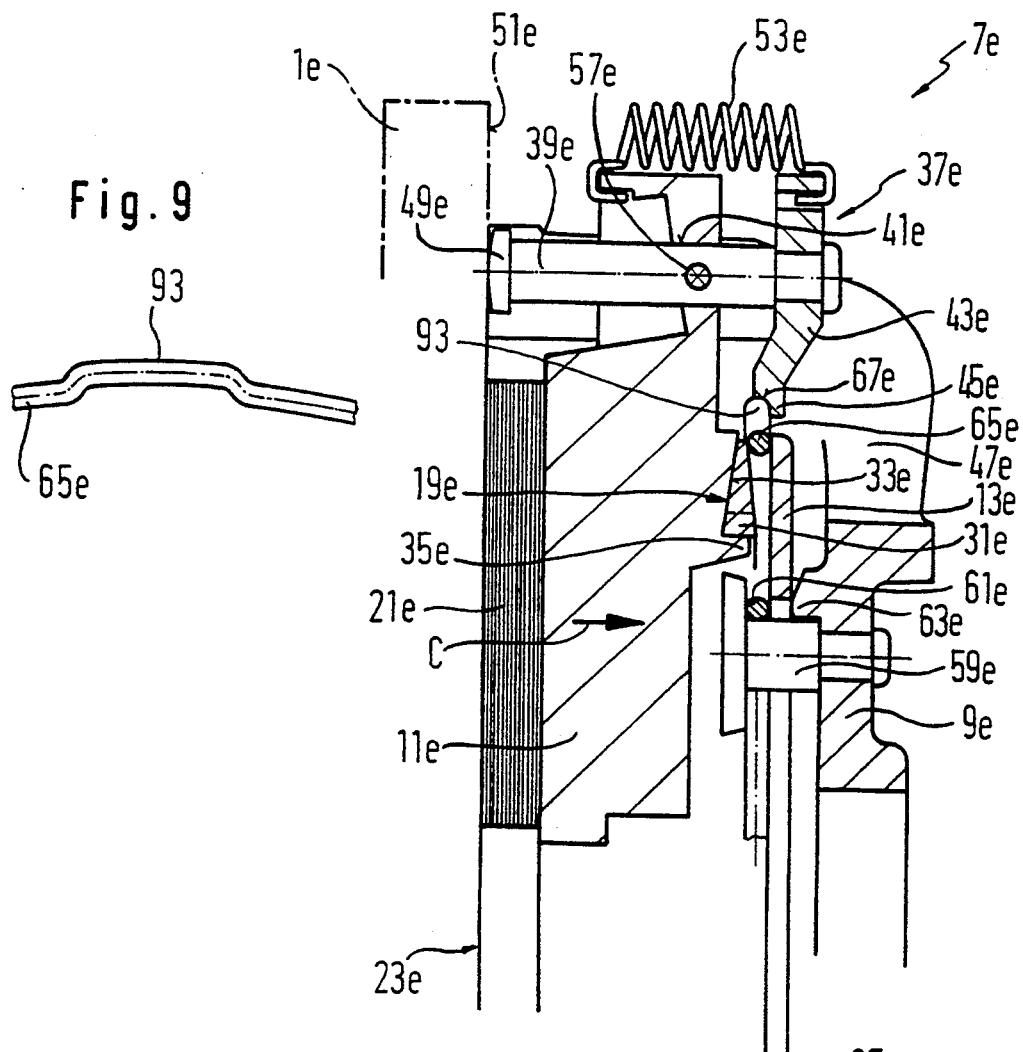

PRESSURE PLATE ARRANGEMENT FOR A MOTOR VEHICLE FRICTION CLUTCH

BACKGROUND OF THE INVENTION

1. Field of the Invention

The invention relates to a pressure plate arrangement for a motor vehicle friction clutch and in particular to a pressure plate arrangement with automatic wear compensation.

2. The Prior Art

A motor vehicle friction clutch is known from DE-A-35 18 781 (GB-A-2 176 256), the pressure plate arrangement of which comprises, as is customary, a clutch housing fastened to a flywheel, a pressure plate disposed on the clutch housing and fixed against relative rotation with it but axially displaceable, and a diaphragm spring clamped under prestress between the clutch housing and the pressure plate. The diaphragm spring presses the pressure plate via friction linings of a clutch disk against the flywheel. The pressure plate unit comprises an automatic wear compensation mechanism with an adjustment device disposed in the path of the support of the diaphragm spring between the diaphragm spring and the pressure plate, which causes the axial movement of the pressure plate away from the diaphragm spring when the friction linings are worn and the friction clutch is disengaged. For this purpose, the adjustment device has a plurality of wedge-shaped spreading bodies distributed in the circumferential direction which, during operation and with the friction clutch disengaged, wander under the effect of centrifugal force into the gap between the pressure plate and the diaphragm spring caused by wear. The known friction clutch has a friction-arresting path-limiting device, which limits the lifting path of the pressure plate in relation to the clutch housing and during the disengagement operation and, when a preset play of the path-limiting device is exceeded, makes it possible for the diaphragm spring to lift off its seat on the pressure plate, so that the wedge-shaped spreading bodies can enter between the diaphragm spring and the pressure plate for compensating the play.

It has been shown to be disadvantageous in connection with this known construction that automatic wear compensation is only possible after the play in the path-limiting device has been traveled and only in the fully disengaged state of the clutch. A construction of this type cannot be used in connection with a hydraulic disconnecting system, for example, because such disconnecting systems would already automatically compensate for small wear paths within the play without the wear compensation mechanism provided becoming effective.

SUMMARY OF THE INVENTION

It is an object of the invention to recite a pressure plate arrangement for a motor vehicle friction clutch which can automatically compensate for small play because of wear in an operationally dependable way. The pressure plate arrangement is also intended to be usable in connection with hydraulic clutch actuation devices.

The invention is based on a pressure plate arrangement for a motor vehicle friction clutch and comprises:
- a clutch housing, which can be fastened on a flywheel which is rotatable around an axis of rotation,
- a pressure plate, which is disposed on the clutch housing and is fixed against relative rotation with it but is axially displaceable, and can be supported on the flywheel via friction linings of a clutch disk,
- a diaphragm spring supported under prestress between a shoulder on the clutch housing and a shoulder on the pressure plate, and
- an adjustment device disposed in the path of the support of the diaphragm spring between the diaphragm spring and the pressure plate, which has at least one movable wear path compensation member which causes an axial movement of the pressure plate away from the diaphragm spring when the friction linings of the friction clutch are worn and the friction clutch is disengaged.

The improvement in accordance with the invention consists in that a plurality of play transfer devices is distributed in the circumferential direction of the pressure plate and is guided at least approximately axially movable, but arrestable, on the pressure plate by friction, that first limit stops, which limit the movement of the play transfer devices towards the flywheel, are provided on a component which is operationally connected with the clutch housing, and that the play transfer devices have second stops, which limit the adjustment path of the wear path compensation member in relation to the pressure plate.

If a certain amount of wear occurs on the friction linings in such a construction, each play transfer device is displaced in relation to the pressure plate by the amount of wear during the clutch engagement operation by means of the first stop fixed on the housing, and wear compensation is performed subsequently during the succeeding disengagement operation. In this way the construction makes possible a continuous compensation of wear as long as a continuously operating adjustment device has been provided. It is also assured by means of this construction that in all operational states the diaphragm spring remains in the same installed position during the entire life of the friction clutch, so that it is possible to design the characteristics of the spring force optimally, and that they remain optimally during the entire service life. The temporal invariancy of the characteristic can be used to design the diaphragm spring for a greater pressing force or, with a preset pressing force, it is possible to use a smaller diaphragm spring.

The play transfer devices are suitably guided in openings of the pressure plate which at least approximately extend parallel to the axis of rotation and can be self-lockingly canted in the openings for arresting. On the one hand, in case of wear it is possible to adjust play transfer devices arrested in this way in the pressure plate with very little force, on the other hand the self-locking permits the transfer of large stop forces. At the same time it is possible to perform the wear compensation without path losses. Self-locking can be assured by means of a suitable geometric size of the play transfer devices and the openings in the pressure plate as well as by a suitable selection of the coefficient of friction. Spring means are preferred which prestress the play transfer devices in their self-lockingly canted position, so that the pressure plate takes along the play transfer devices during a lifting movement of the pressure plate. In addition or alternately it is possible to achieve the self-locking canting of the play transfer devices in that the second stop lies directly on the diaphragm spring. In this case, the second stop and the diaphragm spring are formed in a preferred manner in such a way, that when the friction clutch is disengaged, a force component is generated which assists the self-locking of the play transfer devices in the opening of the pressure plate. This can be achieved, for example, in that the mutual seating surfaces of the second stop and the diaphragm spring are selected so that they have an angle of inclination in respect to the axis-normal plane which is selected such that the seating force has a force component along the seating surface which assists the self-locking effect and which is greater than the frictional force acting between the seating surfaces. In the last-mentioned embodiments, as well as with other variants of so-called "compressed" clutches with play transfer devices resting on a diaphragm spring, the play transfer devices are simultaneously used as the lifting device for the pressure plate. It is also achieved by means of the above described design of the play transfer devices and the diaphragm spring that self-locking is maintained, even though the exterior circumference of the diaphragm spring of the compressed clutch moves along a curved path which under certain circumstances would, without the discussed inclination, cancel the self-locking properties of the play transfer devices.

It is proposed in accordance with a variant that each play transfer device is guided axially displaceable against a frictional force in the pressure plate. Although the frictional force must be overcome by the diaphragm spring, which detracts from the pressing force with which the pressure plate is pressed against the flywheel, it has been shown that under certain operational conditions, such as torsional oscillations and axial oscillations, a slight friction between the play transfer devices and the pressure plate has a positive effect on the functioning of the play transfer devices. The frictionally engaged arresting of the play transfer devices in the pressure plate can be provided as the sole arresting means; however, means increasing frictional engagement can be additionally advantageous in connection with the above described variant with self-locking arresting. It is possible, for example, to achieve frictionally engaged arresting in a very simple manner in that each play transfer device comprises a sliding bolt in the form of a resilient clamping sleeve, which is guided against a frictional force generated by the clamping sleeve in openings of the pressure plate which extend at least approximately parallel to the axis of rotation.

The play transfer devices can be shaped sheet metal pieces which are guided on the pressure plate in an axially movable manner, or they can be angle levers or the like which are seated on shafts fixed on the pressure plate and rest with one lever arm on a first stop, while the second lever arm constitutes the second stop. However, in a particularly simple variant it has been provided that on the side of the pressure plate facing away from the clutch disk each play transfer device has sliding bolt guided in an opening or a bore of the pressure plate and a lever, forming a stop, fastened thereon. Play transfer devices of this type can be easily produced, have a simple structure and still provide an exact limit to the play compensation movement of the adjustment device, particularly since they can be disposed without any space problems at several points distributed around the circumference of the pressure plate.

The lever can rest directly on the wear adjustment member of the adjustment device or on a support ring which itself rests on the wear adjustment member. If in such a case a lift spring, which stresses the pressure plate in the direction of lift, is assigned to the pressure plate, it is possible to structurally separate the functions of clutch actuation, i.e. engagement and disengagement of the clutch on the one hand and, on the other, arresting the adjustment device, so that the particular components can be specially designed for their intended purposes.

On the other hand, the lever of each play transfer device can rest on the diaphragm spring, i.e. it can rest on the adjustment device with the interposition of the diaphragm spring and, if necessary, of a support ring which is concentric with the axis of rotation. In such a case it may be possible to omit lift springs for the pressure plate, because the diaphragm spring takes the pressure plate along via the play transfer devices in the course of its disengagement movement. The last mentioned version is particularly suitable for so-called "compressed" clutches, wherein the adjustment device is preferably supported between the area of the exterior circumference of the diaphragm spring and the pressure plate.

For so-called "tension" clutches, wherein the adjustment device is usefully supported between an area of the diameter of the diaphragm spring which is smaller than it exterior diameter and the pressure plate, it is suggested that the levers of the individual play transfer devices are disposed on the exterior of the clutch housing and extend through openings of the clutch housing up to the diaphragm spring, or extend through openings of the diaphragm spring as far as a support ring resting on the diaphragm spring. In this way it is possible to employ the above described preferred variant of play transfer devices also with tension clutches.

To be able to obtain the function of the adjustment device equally well at low and at high rpm, each play transfer device is usefully embodied in such a way that it is essentially free of centrifugal force in relation to its center of gravity located in the opening of the pressure plate.

It is also advantageous for each play transfer device to be fixed in the pressure plate in such a way that it is secure against twisting in respect to the opening of the pressure plate, thus its lever cannot turn around its sliding bolt. To protect against twisting it is possible for a guide pin, for example in the shape of a radially resilient clamping sleeve, to extend parallel to the opening of the pressure plate on the side of the opening next to the axis of rotation and engage a bore of the lever of the play transfer device. A protection against twisting of this type its operationally especially dependable. However, it is also possible to select the shape of the stop formed by the lever of each play transfer device in such a way that the play transfer device is secure against rotation relative to the diaphragm spring or one of its support rings or the pressure plate. No additional component is required for such fixation. A fixation secure against rotation of each play transfer device can be achieved in a particularly simple manner in that the lever of the play transfer device extends into an opening of the clutch housing and fixes the play transfer device securely against rotation in respect to the clutch housing.

In a preferred embodiment, a spring is disposed between each play transfer device and the pressure plate, which prestresses the second stop in the direction towards the pressure plate. In the course of clutch assembly, this spring assures the resting of the play transfer device on the first stop which is fixed on the housing, by means of which a base position is automatically achieved. With embodiments wherein the play transfer device has a sliding bolt guided displaceably in an opening of the pressure plate, it is possible to house the spring in a particularly space-saving manner if the sliding bolt has a collar on its side facing the flywheel and the spring is supported between the collar and the pressure plate.

In embodiments wherein the arresting of the play transfer device on the pressure plate takes place by means of canting of the sliding bolt in the opening, the spring is suitable embodied or disposed in such a way that it simultaneously generates a moment which provides play-free resting between the opening of the pressure plate and the sliding bolt guided in the opening. Thus the spring assures that during clutch assembly there is immediate self-locking between the sliding bolt and the opening independently of whether, in a suitable design, self-locking is also caused by the diaphragm spring.

Play compensation between the sliding bolt and the opening in which it is guided can be achieved in a particularly simple manner in that the spring is in the form of a conical spring which encloses the sliding bolt, is supported with its end of smaller diameter against the collar and, for generating a play compensation moment acting on the sliding bolt, is supported with its end of larger diameter radially offset in relation to the sliding bolt towards the exterior on the pressure plate. The pressure plate can have a blind bore, which is eccentric in respect to the opening guiding the sliding bolt, for guiding the end of the cone-shaped spring of larger diameter.

Alternatively, the spring can also be embodied as a tension spring and for generating the play compensation moment, can be suspended radially offset towards the exterior in respect to the sliding bolt on the pressure plate and on a part, for example the previously mentioned lever, fastened on the end of the sliding bolt distant from the flywheel. A spring of this type is particularly easy to mount.

It is furthermore suggested to provide friction-increasing means between the sliding bolt and the opening guiding it. For example, such steps could consist in the sliding bolt and/or the opening having surfaces with an increased coefficient of friction. It is possible to achieve an increase in the coefficient of friction by means of a suitable coating, for example. But the surfaces can also be provided with fluting or knurling. In any case, it is assured by these steps that the functional dependability of the play transfer device is assured during extreme operating conditions of the internal combustion engine of the motor vehicle, particularly in case of torsional oscillations and axial oscillations.

The adjustment device per se can be conventionally embodied. It is provided in a preferred embodiment that the wear compensation member comprises a cone-shaped ring which is concentric to the rotational axis, is radially slit and radially tapers toward the outside and is guided radially movable with radial internal stress acting in the direction of a diametrical change, in particular an increase in diameter, on a guide surface, in particular a cone-shaped inclined face of the pressure plate. Such an adjustment device can be produced with comparatively little effort and makes do without additional spring devices.

A support ring is preferably disposed between the cone-shaped ring and the diaphragm spring and is centered on the pressure plate by means of a plurality of centering pins which are offset in respect to each other in the circumferential direction and are parallel to the axis of rotation. The support ring defines an exactly predetermined support between the adjustment device and the diaphragm spring and possibly also in respect to the levers of the play transfer devices.

BRIEF DESCRIPTION OF THE DRAWINGS

Exemplary embodiments of the invention will be explained in detail by reference to the drawings, in which:

FIG. 6 is an axial longitudinal section through the upper half of a further variant of the pressure plate unit of FIG. 2;

FIG. 7 is a sectional front view, looking along a line VII—VII of FIG. 6;

FIG. 8 is an axial longitudinal section through the upper half of a further variant of the pressure plate unit of FIG. 2; and FIG. 9 is a detailed view of a support ring of the pressure plate unit of FIG. 8.

DETAILED DESCRIPTION

Figure 1:
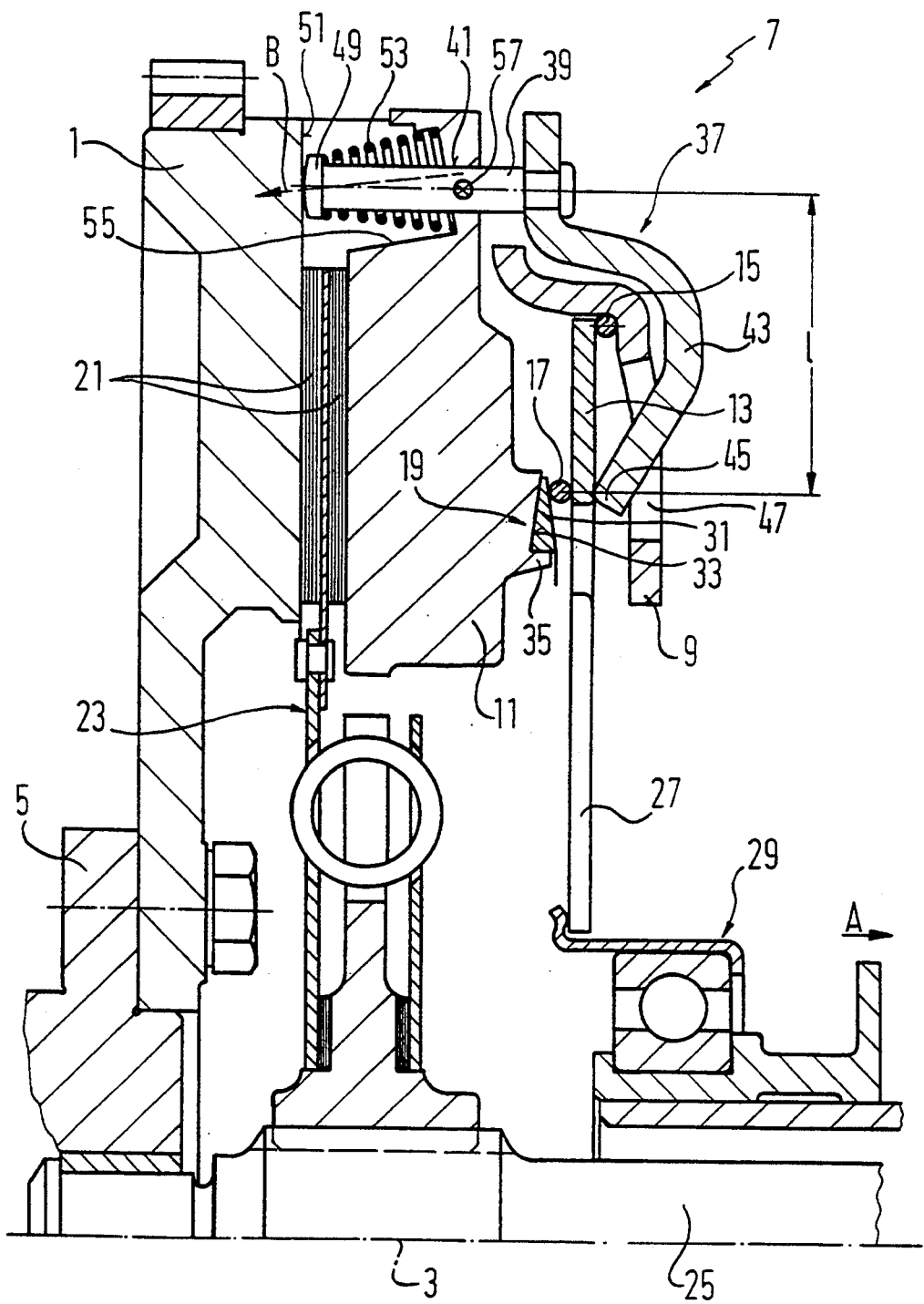
FIG. 1 is an axial longitudinal section through the upper half of a tension friction clutch of a motor vehicle, the pressure plate unit of which comprises an automatic wear compensation device in accordance with the invention.

FIG. 1 shows a motor vehicle friction clutch with a flywheel 1 fastened on a crankshaft 5 of an internal combustion engine turning around an axis of rotation 3. A pressure plate unit 7 is fastened on the flywheel 1, which comprises a clutch housing 9 maintained on the flywheel 1 fixed against relative rotation, for example bolted, a pressure plate 11 guided in a manner not shown in detail on the clutch housing in a manner fixed against relative rotation, but axially displaceable, and a diaphragm spring 13 clamped between the clutch housing 9 and the pressure plate 11. On its exterior circumference the diaphragm spring 13 is supported via a support ring 15 on the clutch housing and, at a diameter which is less in comparison with the exterior diameter, via a support ring 17 and a compensation device 19, to be described in detail below, at the pressure plate 11. The diaphragm spring 13 stresses the pressure plate 11 in the direction toward the flywheel 1. A clutch disk 23 with friction linings 21 is disposed between the pressure plate 11 and the flywheel 1 and is seated fixed against relative rotation on an input shaft 25 of a transmission, not shown in detail. The diaphragm spring 13 has radially inward extending spring tongues 27 which are in connection with a disconnecting device 29. For the embodiment illustrated, the disconnecting device 29 is moved in the direction of an arrow A and, via the spring tongues 27, axially moves the area of the diaphragm spring 13 resting on the support ring 17 away from the flywheel 1 and in this way removes the load from the pressure plate 11 and thus the clutch disk 23.

The adjustment device 19 comprises a slit, radially outwardly tapering cone-shaped ring 31 in the path of the support force between the support ring 17 and the pressure plate 11. The cone-shaped ring 31 rests on an inclined face 33, for example also cone-shaped, which has the same inclination as the surface area of the cone-shaped ring 31 facing it, and is installed in such a way between the support ring 17 and the inclined face 33 that, because of its internal stress and by an increase in diameter, it is driven between the inclined face 33 and the support ring 17. At least while the friction clutch is new, the cone-shaped ring 31, which is concentric to the axis of rotation 3, is fixed in the radially inward direction by a shoulder 35 of the pressure plate 11. The cone-shaped ring 31 has two cone surfaces which radially extend outwardly towards each other in an oblique manner and, in the course of wear of the friction linings 21, because of its internal stress it is driven into the gap between the inclined face 33 and the support ring 17, which becomes larger because of wear, as soon as this gap is enlarged because of wear.

A plurality of play transfer devices 37 is distributed over the circumference of the pressure plate unit 7, is guided axially movable on the pressure plate 11 and fixes the distance between the inclined face 33 and the support ring 17. The play transfer devices transfer the disengagement movement, transmitted by the disconnecting device 29 to the diaphragm spring 13, to the pressure plate 11. Each one of the play transfer devices 37 comprises a sliding bolt 39 with a cylindrical exterior shape, the center axis of which extends parallel to the axis of rotation 3, and which is guided radially displaceable outside of the friction linings 21 in a bore 41 of the pressure plate 11. An actuating lever 43 is fastened on the end of the sliding bolt 39 remote from the flywheel 1, for example by riveting, encloses the clutch housing 9 on the exterior, extends with its radially inward pointing end 45 through an opening 47 of the clutch housing 9 and rests on the diaphragm spring 13 on the side of the diaphragm spring 13 facing away from the pressure plate 11. Axially opposite the support ring 17 and at the same diameter, the end 45 of the actuating lever 43 rests on the diaphragm spring 13. On its end facing the flywheel 1, the sliding bolt 39 has a head 49 which is supported on a contact face 51 of the flywheel 1. A conical spring 53 is clamped between the head 49 and the pressure plate 11 and encloses the sliding bolt 39 and is supported with its end of small diameter on the head 49. The end of the conical spring 53 of larger diameter is guided in a blind bore 55 of the pressure plate 11. The conical spring 53 exerts a force B on the sliding bolt 39 which tries to reduce the distance between the head 49 and the contact face 51 until contact is made between them. Because in addition the end of the conical spring 53 of greater diameter, which is guided in the blind bore 55, is offset in the direction towards the bore 41, the force B generates a moment in respect to a virtual pivot point 57, located in the bore 41, of the sliding bolt 39, which causes the arrangement, without play, of the sliding bolt 39 in the bore 41. As also shown in FIG. 1, the point of contact of the diaphragm spring 13 with the support ring and the end 45 of the actuating lever 43 is at a radial distance 1 from the bore 41 or the longitudinal axis of the sliding bolt 39. Thus, the disengagement movement of the diaphragm spring 13 also exerts a moment in relation to the pivot point 57 on the sliding bolt 39 which acts in the same direction as the moment generated by the force B. The distance 1 between the longitudinal axis of the sliding bolt 39 and the support area of the diaphragm spring 13 has been selected in such a way that, together with the coefficient of friction between the sliding bolt 39 and the bore 41, self-locking between the sliding bolt 39 and the bore 41 is generated in the course of the disengagement movement of the disconnecting device 29 in the direction A, because of which the pressure plate 11 is taken along via the actuation levers 43 of the play transfer devices 37, i.e. is lifted. The members, such as tangential leaf springs, provided for the guidance of the pressure plate 11 on the clutch housing 9 in a manner fixed against relative rotation, but axially displaceable, are designed in such a way that they do not generate an axial force in the direction toward the diaphragm spring 13 which would assist the lifting process.

The automatic wear compensation operates as follows:

If, because of engagement in the course of a starting process, for example, noticeable wear of the touching friction areas of the friction linings 21, on the one hand, and the flywheel 1 and the pressure plate 11, on the other, is generated, a gap of a width corresponding to the wear will remain between the diaphragm spring 13 and the radially innermost ends 45 of the actuation levers 43.

Thus, in the course of the first subsequent disengagement process the diaphragm spring 13 will come to rest on the ends 45 of the actuation levers 43 and simultaneously transfer the distance represented by the wear to the side facing the flywheel 1. Thus, play is generated between the support ring 17 and the cone-shaped ring 32 which, because of its radial prestressing, makes it possible for the cone-shaped ring 31 to expand outwardly along the inclined surface 33 until the play is used up. Since, on the other hand, there is self-locking between the sliding bolt 39 and the bore 41 during the disengagement process, the cone-shaped ring 31 can only be displaced by an amount determined by this play. In this way it is assured that during the subsequent engagement process the diaphragm spring 13 can again take up its original position, while the adjustment device 19 compensates for the distance between the diaphragm spring 13 and the pressure plate 11 which had been increased by the wear. Thus, during the entire possible wear path, the diaphragm spring 13 maintains its original position, sized for optimal operation. This has the advantage that the spring volume of the diaphragm spring can be fully utilized because the position of the diaphragm spring remains constant.

During assembly of the friction clutch the cone-shaped ring 31 is installed with radially outward directed prestressing. It therefore must be held against the shoulder 35 during the assembly process. The remaining components of the adjustment device 19 and the play transfer devices 37 are adapted to each other in such a way that in the unused state the heads 49 of the sliding bolts 39 come into contact by the force of the conical springs 53, or are only at a small distance. In this way it is assured that in the unused state the cone-shaped ring 31, on the one hand, is kept in its radially innermost position and, on the other, there is no play between the diaphragm spring 13 and the components in contact with the diaphragm spring 13 in the area of the diameter of the support ring 17, i.e. the ends 45 of the actuation levers 43, the support ring 17, the cone-shaped ring 31 and the pressure plate 11. The above explained self-locking properties of the play transfer devices 37 already assure from the start that the pressure plate 11 can be lifted via the play transfer devices 37. In the course of this, the only job of the conical spring 53 is to assure that in the engaged state of the clutch the actuation lever 43 is maintained in its position closest to the flywheel 1 and that, regardless of the state of the clutch, play between the sliding bolt 39 and the bore 41 is cancelled. By means of this it is assured that immediately at the start of a disengagement movement in accordance with the arrow A it is possible to transfer the lifting motion to the pressure plate 11 via the actuation levers 43. In case that in the course of assembly of the friction clutch the sliding bolts 39 cannot come completely into contact with the flywheel 1 with their heads 49, for example because of unfavorable tolerances, the function of the automatic compensation device in the area of the cone-shaped rings 31 is suspended only long enough until the gap between the heads 49 and the contact face 51 of the flywheel 1 is used up. The automatic wear compensation takes over thereafter.

In place of a slit cone-shaped ring 31 disposed concentrically with the axis of rotation 3 it is also possible to provide a plurality of cone-shaped elements separately of each other, which are disposed distributed in the circumferential direction and each one of which is prestressed radially outward by spring means. It is also possible to utilize the centrifugal forces acting on the cone-shaped elements for adjustment.

Because the play transfer devices 37 or their actuation levers 43 are not symmetrical with the displacement axis of the sliding bolts 39, additional steps for protection against twisting are provided. In the exemplary embodiment of FIG. 1, the actuation levers 43 pass through the openings 47 of the clutch housing 9 and are guided secure against twisting in the openings 47.

Variants of pressure plate units will be described in what follows. To the extent that components with like action are used, they are identified by the reference numerals of the previously described components and are provided with a letter for showing the difference. Reference is made in any case to the previous description in the explanation of the structure and function.

Figure 2:
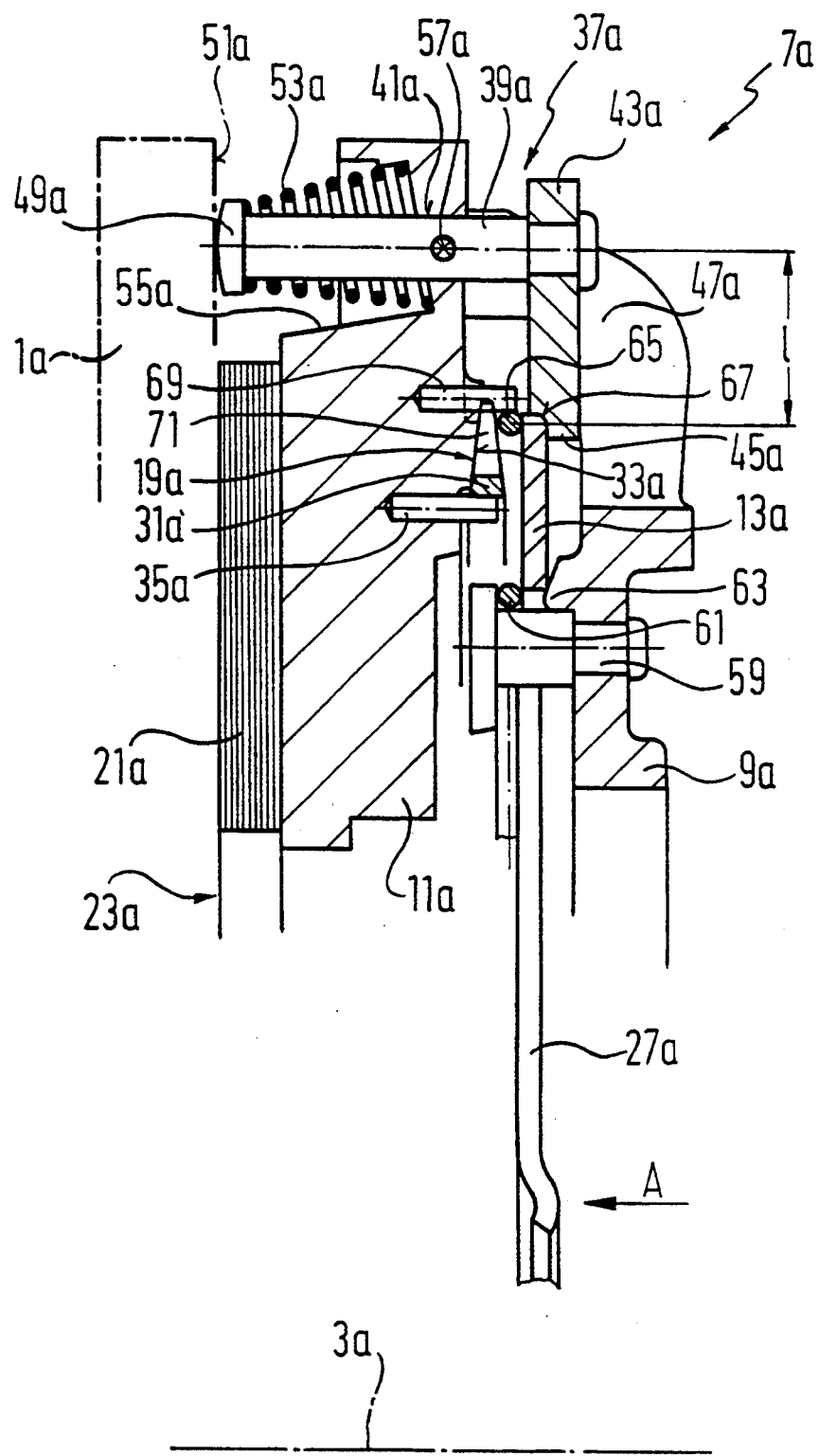
FIG. 2 is an axial longitudinal section through the upper half of a pressure plate unit of a compressed friction clutch of a motor vehicle.

In contrast to FIG. 1, FIG. 2 shows a pressure plate unit 7a of a compressed clutch, wherein the diaphragm spring 13a is fixed by means of a plurality of spacing bolts 59, distributed over the circumference, in a central area, i.e. in the area of the transition of its annularly closed spring body to the spring tongues 27a. In this area the diaphragm spring 13a is guided by the spacing bolts 59 over a tilt circle along a rocker bearing ring or support ring 61 and an axially oppositely located support 63 of the clutch housing 9a. In the area of its exterior diameter, the diaphragm spring 13a is supported via a support ring 65 and the adjustment device 19a on the pressure plate 11a for transmitting the disengagement and engagement movements. The play transfer devices 37a have actuation levers 43a, which also rest on the side of the diaphragm spring facing away from the pressure plate 11a. They are provided with recesses 67 for making them secure against twisting in respect to the diaphragm spring 13a. Otherwise the play transfer devices 37a correspond to the play transfer devices explained by means of FIG. 1.

As furthermore shown in FIG. 2, the cone-shaped ring 31a, which is prestressed radially outward, is radially fixed on a plurality of centering pins 35a distributed over the circumference, which correspond to the shoulders 35 of FIG. 1. A plurality of centering pins 69 is provided for the fixation of the support ring 65, which are disposed on the pressure plate 11a and distributed in the circumferential direction and, corresponding to the centering pins 35a, extend paraxially in respect to the axis of rotation 3a. In the area of the centering pins 69, the cone-shaped ring 31a has slits 71.

The pressure plate unit 7a of FIG. 2 is disengaged toward the flywheel 1a by displacement of the spring tongues 27a in the direction of the arrow A, because of which the area of the exterior diameter of the diaphragm spring 13a moves away axially from the flywheel 1a. The function of the play transfer devices 37a, which again can be self-lockingly twisted in the bores 41a of the pressure plate 11a, corresponds to the play transfer devices of the tension clutch of FIG. 1. The adjustment device 19a also operates in the already described manner.

Figure 3:
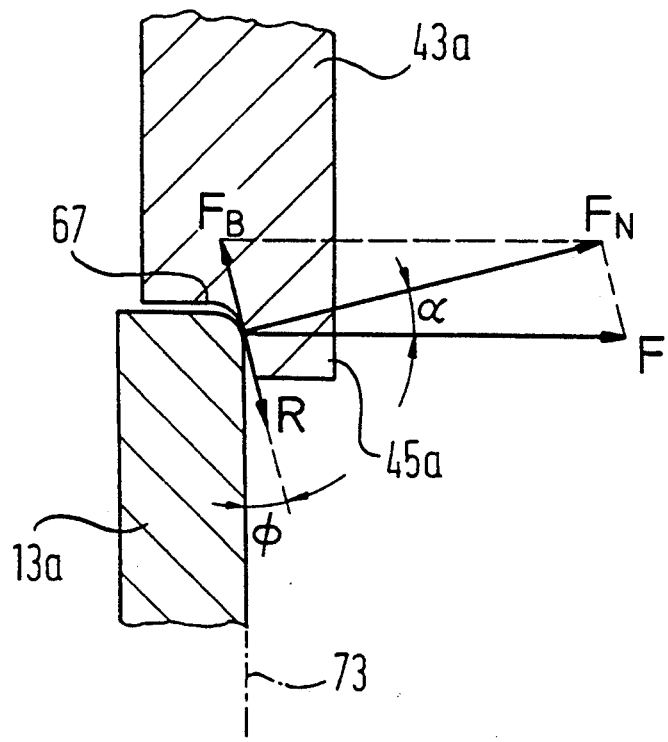
FIG. 3 is a detailed view of the pressure plate unit of FIG. 2.

A special feature of the construction of FIG. 2 is shown in detail in FIG. 3. The radially exterior area of the diaphragm spring 13, which essentially extends in a normal way in respect to the axis of rotation 3a, performs an approximately circular movement, with a movement component directed radially inward, when the clutch is disengaged. It is possible that the radially inward directed movement component can result in that the start of self-locking between the sliding bolts 39a and the bore 41a is delayed or even cancelled. It is possible to counteract this effect if the diaphragm spring 13a and the actuation lever 43 rest against each other by means of support faces extending at an angle in respect to the normal axial plane. As shown in FIG. 3, the support faces are inclined at an angle $\alpha$ in respect to the normal axial plane indicated at 73. Thus the normal force $F_N$ transmitted by the diaphragm spring 13a to the actuation lever 43a is also inclined at the angle $\alpha$ in respect to the force F acting in the axial direction of the sliding bolts 39a and therefore parallel to the axis of rotation 3a. Because of this inclination, a force $F_B$ is created in the plane of the contact face, while a frictional force R occurs in the opposite direction because of friction between the inclined support faces. The frictional force R is the result of the value of the force F multiplied by the coefficient of friction $\mu$ of the support faces resting on each other. It is assured by appropriate selection of the angle $\alpha$ and the coefficient of friction $\mu$ that the force $F_B$ is always greater than the frictional force R, so that when the clutch is operated, the force component in the radial direction which assists the self-locking mechanism between the sliding bolt 39a and the bore 41a is preponderant. In a conventional manner the frictional force R defines a friction angle $\phi$. In respect to the friction angle it must be assured for assisting the self-locking mechanism that the angle $\alpha$ is always greater than the angle $\phi$.

The enlarged view of FIG. 3 further shows that the recess 67 at the radially inner end 45a of the actuation lever 43a extends at a small radial distance in respect to the exterior diameter of the diaphragm spring 13a and, because of the extension of the actuation lever 43a in the circumferential direction simultaneously forms a protection against twisting for the play transfer device 37a.

In comparison with the clutch of FIG. 1, the actuation levers 43a of the play transfer devices 37a are disposed comparatively close to the pivot point 57a, so that the center of gravity of each play transfer device 37a and its pivot point 57a are essentially located in a common axially normal plane. In this way the play transfer devices 37a are unaffected by centrifugal force and self-locking is therefore independent from the instantaneous rpm.

Figure 4:
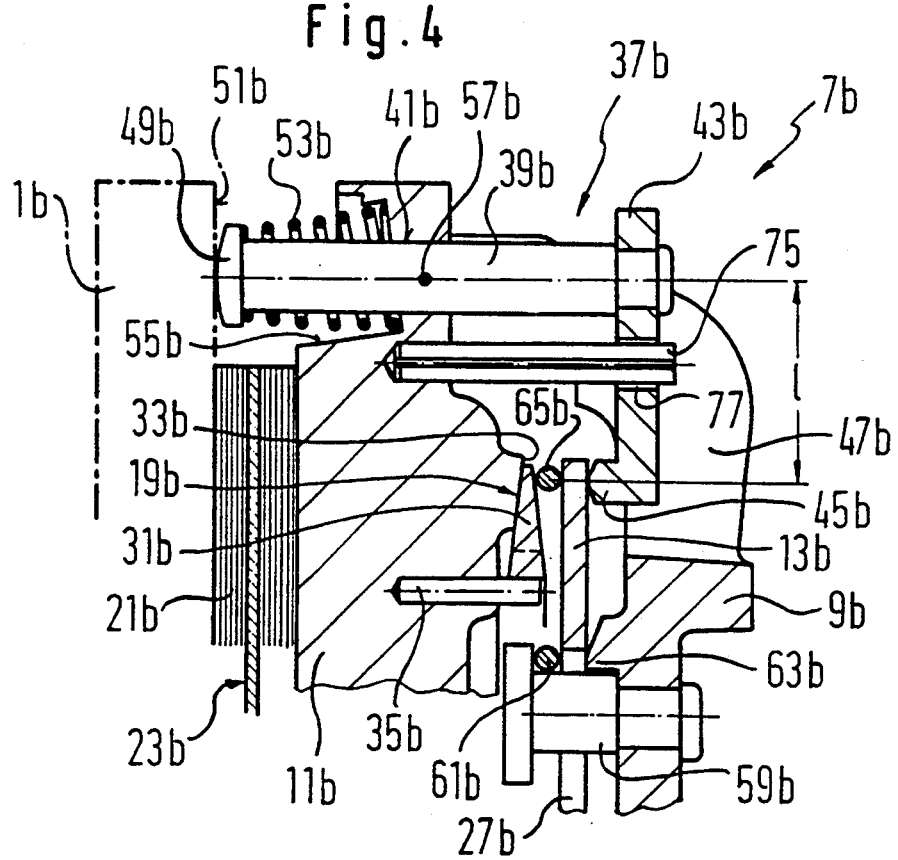
FIG. 4 is a partial section through a variant of the pressure plate unit of FIG. 2.

FIG. 4 shows a variant of a compressed clutch, which is primarily different from the clutch of FIGS. 2 and 3 because of the type of protection against twisting of the play transfer device 37b. A guide pin, in this case in the form of a clamping sleeve 75, is fixedly inserted paraxially to the sliding bolt 39b into the pressure plate 11b radially between the sliding bolt 39b of the play transfer device 37b and the end 45b of the actuation lever 43b of each play transfer device 37b and extends through a bore 77 of the actuation lever 43b, guiding the play transfer device 37b protected against twisting in the pressure plate 11b. In addition, the end 45b of the actuation lever 43b resting on the diaphragm spring 13b is embodied as a cutting edge.

The pressure plate units described in FIGS. 1 to 4 allow an automatic adjustment, operating essentially free of axial forces, within the friction clutch. In this connection, the axial force component of the conical springs 53, 53a and 53b can be neglected, because it is very small in comparison to the other axial forces. In particular, it is considerably smaller than the displacement force which must be provided in conventional adjustment devices. The functioning of the adjustment device assures that adjustment is also assured in connection with a hydraulic clutch operating system. This is a particular result of the fact that the wear compensation in principle takes place at the start of the disengagement path and is independent of the length of the subsequent disengagement path. In contrast thereto, in connection with conventional adjustment devices a defined maximum disengagement path must be traveled before adjustment can be performed. This is disadvantageous in connection with hydraulic disengagement devices, because such systems themselves automatically cause an adjustment after a defined disengagement path has been traveled, so that in case of unfavorable size conditions adjustment does not take place in the clutch, but in the disengagement system. But the construction in accordance with the invention can also be advantageously combined with a hydraulic disengagement system for the following reasons. Because the diaphragm spring does not change its relative position within the friction clutch even with wear, the hydraulic disengagement system can be designed for a very small axial disengagement stroke, which reduces the space requirements. These advantages are also a result of the embodiments discussed below.

In the pressure plate units described by means of FIG. 1 to 4, the play transfer devices are supported on the pressure plate via the diaphragm spring and the adjustment device. Simultaneously the play transfer devices are also used for lifting the pressure plate, so that a separate lifting spring system of the pressure plate can be omitted. In connection with the exemplary embodiments described below, the pressure plate is lifted independently of the function of the play transfer devices and the adjustment device.

FIG. 5 again shows a pressure plate unit 7c of a tension friction clutch, which is primarily different from the clutch of FIG. 1 by the design of the play transfer devices 37c. The diaphragm spring 13c of the pressure spring unit 7c again is supported in the area of its exterior diameter via the support ring 15c on the clutch housing 9c and with a smaller diameter rests on the pressure plate 11c via the support ring 17c and the slit cone-shaped ring 31c of the adjustment device 19c. Again the pressure plate 11c is guided, fixed against relative rotation, but axially displaceable in a manner not shown in detail, on the clutch housing 9c, for example via conventional tangential leaf springs. But in contrast to the design of FIG. 1, the pressure plate 11c is stressed by a lifting force in the direction of an arrow C, for example via tangential leaf springs.

Again the play transfer devices 37c distributed over the circumference of the pressure plate 11c have a sliding bolt 39c, which is displaceably guided in a bore 41c paraxially in relation to the axis of rotation 3c and is secured on the side of the flywheel 1c by means of a head 49c. The sliding bolts 39c extend through the clutch housing 9c into openings 79 and again support actuation levers 43c on the exterior of the clutch housing. Each actuation lever 43c extends radially inward from the sliding bolt 39c and in the area of the support ring 17c extends through an opening 47c provided in the clutch housing 9c. The end 45c of the actuation lever furthermore extends through an opening 81 of the diaphragm spring 13c located in the area of the support ring 17c and rests on the support ring 17c on the side of the diaphragm spring 13c adjoining the pressure plate 11c. The play transfer devices 37c are guided, protected against twisting, by the actuation levers 43c in the openings 47c of the clutch housing 9c.

To compensate for play of the sliding bolts 39c in the bores 41c and to assure self-locking of the play transfer devices 37c, a tension spring 53c is disposed respectively on the radially outward located side of the sliding bolt 39c, and is suspended with one end on the pressure plate 11c and with the other in a radially outwardly protruding end 83 of the actuation lever 43c. The function of the tension springs 53c corresponds to that of the conical spring 53. While with the clutch of FIG. 1 the sliding bolt rests with is end on the side towards the flywheel against a contact face of the flywheel, the clutch housing 9c fixedly connected with the flywheel 1 is used in the design in accordance with FIG. 5. In the area of the sliding bolt 39c, the clutch housing 9c forms a contact face 51c, against which the actuation lever 43c rests.

During assembly of the friction clutch, the tension springs 53c assure that the actuation levers 43c rest against the contact faces 51c of the clutch housing 9c. At the same time it is assured at the beginning of assembly that the radially outwardly resilient cone-shaped ring 31c is maintained in its radially innermost position, i.e. the one with the smallest diameter. When the actuation levers 43c rest against the clutch housing 9c, the cone-shaped ring 31c is released, so that it can slightly expand because of its internal stress and comes to rest against the inclined face 33c as well as, via the support ring 17c, on the radially inner ends 45c of the actuation levers 43c, so that it assists the self-locking of the sliding bolts 39c in the bores 41c which was already triggered by the tension springs 53c.

For disengagement of the clutch, the spring tongues 27c of the diaphragm spring 13c are moved in the direction of the arrow A, in the course of which the pressure plate 11c is displaced in the direction of the arrow C by means of its lift springs. The lift spring force in this case is adapted to the function of the adjustment device 19c in such a way that it does not hamper a possible wear compensation. If in the course of the engagement movement the friction lining 21c of the clutch disk 23c becomes excessively worn, for example because of a long lasting slippage when transmitting a large torque, the pressure plate 11c axially moves towards the flywheel 1c by the amount of wear, while the play transfer devices 37c resting on the contact faces 51c of the clutch housing 9c cannot follow this movement. Thus a play corresponding to the lining is generated between the radially inner ends 45c of the actuation levers 43c and the support ring 17c. With the clutch engaged, the adjustment device 19c is prevented from compensating this play by the pressure force of the diaphragm spring 13c. However, the pressure force is cancelled during the next following disengagement of the clutch, so that the cone-shaped ring can wander into the gap between the support ring 17c and the pressure plate 11c to the same extent as the diaphragm spring 13c is lifted off the support ring 17c, and can fill the gap between the support ring 17c and the ends 45c of the actuation levers 43c. During this the cone-shaped ring 31c must act against the force of the lifting resilience of the pressure plate 11c acting in the direction of the arrow C. If the gap caused by wear is filled, the lifting resilience again assists the self-locking between the sliding bolts 39c and the bores 41c in addition to the tilting moment generated at the play transfer devices 37c by the tension springs 53c.

In the embodiments described above, the play transfer devices are arrested self-lockingly in the bores of the pressure plate by tilting. To be able already at the start to provide for a play compensation between the sliding bolts of the play transfer devices and the bores of the pressure plates, it is possible to provide additional springs exerting a tilting moment on the play transfer devices. FIG. 6 shows a pressure plate unit 7d of a compressed clutch, wherein the sliding bolt of the play transfer device 37d has the form of a radially resilient clamping sleeve 39d, which, because of its radially resilient properties, is seated without play in the bore 41d on account of friction. It is therefore possible to omit springs for compensating the play between the clamping sleeve 39d and the bore 41d. An actuation lever 43d is fastened by means of a head bolt 85 on the end of the clamping sleeve 39d remote from the flywheel 1d, which is supported by its end 45d on the side of the support ring 65d, facing away from the pressure plate 11d, which rests on the exterior diameter of the diaphragm spring 13d. So as not to collide with the diaphragm spring 13d in this area, the support ring 65d is bent away from the diaphragm spring 13d to form a receiving area 87, as shown in FIG. 7, wherein the cone-shaped ring 31d is provided with a recess 89 for housing the receiving area 87. The end 45d of the actuation lever 43d is tapered by means of a recess 91 and maintains the play transfer device 37d fixed against relative rotation in the bore 41d.

When assembling the pressure plate unit 7d, the clamping sleeves 39d and thus the actuation levers 43d are brought into a basic position in which the clamping sleeves 39d rest without play against the contact face 51d of the flywheel 1d. When wear of the friction linings 21d of the clutch disk 23d occurs, the pressure plate is moved in the direction towards the flywheel 1d by the force of the diaphragm spring 13d while the play transfer devices 37 maintain their position in relation to the flywheel 1d and the clutch housing 9d, while increasing their distance from the pressure plate 11d. In the course of the subsequent disengagement process of the clutch, the force of the lifting device of the pressure plate 11d assures that it will want to move in the direction of the arrow C, while the radial prestressing of the cone-shaped ring 31d simultaneously tries to compensate for the play between the actuation levers 43d and the pressure plate 11d. In this case the axial force component generated by means of the adjustment device 19d assists the frictional engagement between the bore 41d and the clamping sleeve 39d to effect self-locking.

It should be mentioned that it possible to provide measures increasing the frictional engagement also in connection with the above described embodiments, wherein the play transfer devices are self-lockingly guided by canting in bores of the pressure plate. In the above described embodiments, too, the sliding bolts can be embodied as clamping bolts, or the sliding bolts and/or the bores can be provided with friction-increasing surface structures, such as rough surfaces, friction pairings with a high coefficient of friction or flutings or grooves or the like. Corresponding measures can also be used in the embodiment in accordance with FIG. 6 or the variant explained below.

Figure 5:
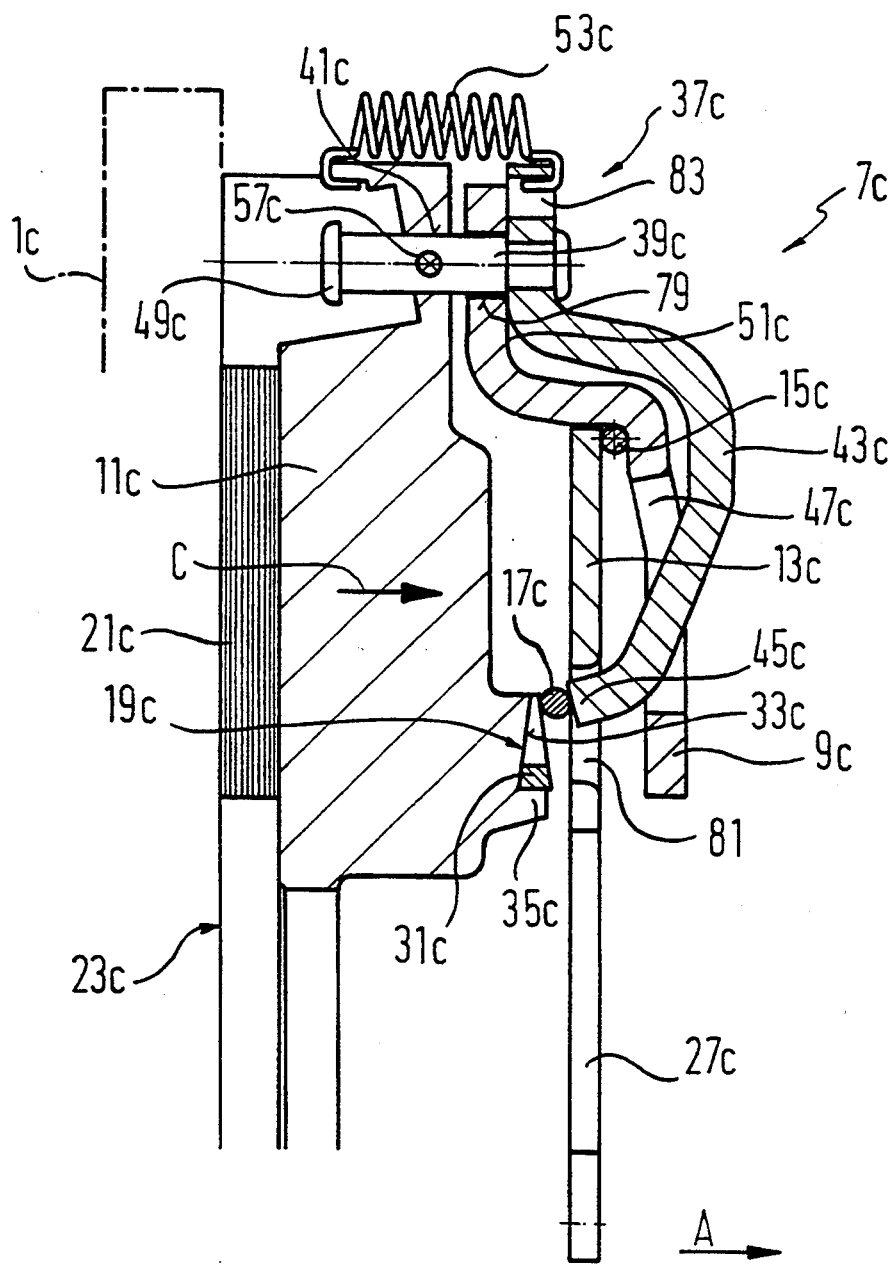
FIG. 5 is an axial longitudinal section through the upper half of a variant of the pressure plate unit of FIG. 1.

FIGS. 8 and 9 show a pressure plate unit 7e of a compressed friction clutch, the play transfer devices 37e of which have sliding bolts 39e which, similar to the embodiment of FIG. 2, rest with a head 49e on the flywheel 1e and which in connection with tension springs 53e, similar to the exemplary embodiment of FIG. 5, can be self-lockingly arrested in bores 41e of the pressure plate 11e. Support of the ends 45e of the actuation levers 43e connected with the sliding bolts 39e is accomplished in a way similar to the variant of FIG. 6, but the support ring 65e supporting the exterior diameter of the diaphragm spring 13e has areas 93 radially extending beyond the exterior circumference of the diaphragm spring 13e (FIG. 9), on which the end 45e of the actuation levers 43e radially rests outside the diaphragm spring 13e. The ends 45e are provided with recesses 67e which, corresponding to the variant of FIGS. 2 or 3, on the one hand constitute a protection against twisting for the play transfer device 37e and, on the other, assist the self-locking of the play transfer devices 37e by support faces extending at an inclination, as was described by means of FIG. 3. In the variant in accordance with FIG. 8 and 9, too, a device generating a lifting force is assigned to the pressure plate 11e.

We claim:

1. A pressure plate arrangement for a friction clutch of a motor vehicle, comprising
   a clutch housing (9), which is adapted to be fastened on a flywheel (1) for rotation therewith around an axis of rotation (3)
   a pressure plate (11), which is disposed on the clutch housing (9) and is fixed against rotation relative to the clutch housing but is axially displaceable, and is adapted to supported on the flywheel (1) via friction lining (21) of a clutch disk (23),
   a diaphragm spring (13) supported under prestress between a shoulder on the clutch housing (9) and shoulder on the pressure plate (11), and
   an adjustment device (19) between the diaphragm spring (13) and the pressure plate (11), the adjustment device having at least one wear path compensation member (31) which is movable along an adjustment path and causes an axial movement of the pressure plate (11) away from the diaphragm spring (13) when the friction linings (21) of the clutch disk (23) are worn and the friction clutch is disengaged, characterized in that a plurality of play transfer devices (37) are arranged in spaced-apart relation in the circumferential direction of the pressure plate (11) and are guided so as to be at least approximately axially movable, but arrestable, on the pressure plate (11) by friction, that first limit stops (51), which limit the movement of the play transfer devices (37) towards the flywheel (1), are provided on a component which is operationally connected with the clutch housing (9), and that each of the play transfer devices (37) has a second stop (45), which limits the adjustment path of the wear path compensation member (31) in relation to the pressure plate (11).

2. An arrangement in accordance with claim 1, characterized in that the play transfer devices (37) are guided in openings (41) of the pressure plate (11) which extend at least approximately parallel to the axis of rotation (3) and are self-lockingly canted in the openings (11) for arresting their movement relative to the pressure plate.

3. An arrangement in accordance with claim 2, characterized in that spring means (53) prestress the play transfer devices (37) to a self-lockingly canted position in the openings, so that the pressure plate (11) and play transfer devices (37) move conjointly during a lifting movement of the pressure plate (11).

4. An arrangement in accordance with claim 2, characterized in that the second stop (45; 45a, b) lies directly on the diaphragm spring (13; 13a, b) and that the second stop (45; 45a, b) and the diaphragm spring (13; 13a, b) are formed in such a way that, when the friction clutch is disengaged, a force component is generated which assists the self-locking of the play transfer devices (37; 37a, b) in the respective openings (41; 41a, b) of the pressure plate (11; 11a, b) in which they are guided.

5. An arrangement in accordance with claim 4, characterized in that mutual seating surfaces of the second stop (45a) and the diaphragm spring (13a) are selected so that they have an angle of inclination (α) in respect to a plane perpendicular to the axis which is selected such that a seating force acting at the mutual seating surfaces has a force component which assists the self-locking effect and which is greater than the frictional force acting between the seating surfaces.

6. An arrangement in accordance with claim 1, characterized in that each play transfer device (37d) is arrested by frictional engagement on the pressure plate (11d) and is displaceably guided in the direction of the axis of rotation (3d).

7. An arrangement in accordance with claim 6, characterized in that each play transfer device (37d) comprises a sliding bolt (39d) in the form of a resilient clamping sleeve, which is guided against a frictional force generated by the clamping sleeve in an opening (41d) of the pressure plate (11d) which at least approximately extends parallel to the axis of rotation (3d).

8. An arrangement in accordance with claim 1, characterized in that each play transfer device (37) has a sliding bolt (39) guided in an opening (41) of the pressure plate (11) and the second stop of each play transfer device is a portion of a lever to which the sliding bolt is affixed and which is located on the side of the pressure plate (11) facing away from the clutch disk (23).

9. An arrangement in accordance with claim 8, characterized in that the lever (43c to e) is supported independently of the diaphragm spring (13c to e) on the wear path compensation member (31c to e), and that a lifting device biases the pressure plate in a direction to disengage it from the friction linings of the clutch disk.

10. An arrangement in accordance with claim 8, characterized in that the lever (43; 43a, b) rests on the diaphragm spring (13; 13a, b).

11. An arrangement in accordance with claim 9, characterized in that the adjustment device (19a, b, d, e) is supported between the area of the exterior circumference of the diaphragm spring (13a, b, d, e) and the pressure plate (11a, b, d, e).

12. An arrangement in accordance with claim 9, characterized in that the adjustment device (19; 19c) is supported between an area of the diameter of the diaphragm spring (13; 13c) which is smaller than its exterior diameter, and the pressure plate (11; 11c).

13. An arrangement in accordance with claim 12, characterized in that the levers (43; 43c) are disposed on the exterior of the clutch housing (9; 9c) and extend through openings (47; 47c) of the clutch housing (9; 9c) up to the diaphragm spring (13), or extend through openings (81) of the diaphragm spring (13c) as far as a support ring (17c) resting on the diaphragm spring (13c).

14. An arrangement in accordance with claim 8, characterized in that in respect to a pivot point in the opening (41a, d, e) of the pressure plate (11a, d, e), each play transfer device (37a, d, e) is essentially not subject to centrifugal force.

15. An arrangement in accordance with claim 8, characterized in that each play transfer device (37) is fixed secure against twisting in respect to the opening (41) of the pressure plate (11).

16. An arrangement in accordance with claim 15, characterized in that on the side of the opening (41) next to the axis of rotation a guide pin in the shape of radially resilient clamping sleeve (75) extends parallel to the axis of the opening (41b) and engages a bore (77) of the lever (43b) of the play transfer device (37b).

17. An arrangement in accordance with claim 15, characterized in that the shape of the second stop (45a, d, e) formed by the lever (43a, d, e) of each play transfer device (37a, d, e) is selected in such a way that the play transfer device (37a, d, e) is fixed secure against rotation relative to the diaphragm spring (13a) and the pressure plate about the axis of rotation.

18. An arrangement in accordance with claim 15, characterized in that the lever (43; 43b, c) of each play transfer device (37; 37b, c) extends into an opening (47; 47b, c) of the clutch housing (9; 9b, c) and fixes the play transfer device (37; 37b, c) securely against rotation in respect to the clutch housing (9; 9b, c).

19. An arrangement in accordance with claim 1, characterized in that a spring (53; 53a to c, e) is disposed between each play transfer device (37; 37a to c, e) and the pressure plate (11; 11a to c, e), which prestresses the second stop (45; 45a to c, e) in the direction towards the pressure plate (11; 11a to c, e).

20. An arrangement in accordance with claim 19, characterized in that each play transfer device (37; 37a, b, e) has a sliding bolt (39; 39a, b, e) guided displaceably in an opening (41; 41a, b, e) of the pressure plate (11; 11a, b, e), which has a collar (49; 49a, b, e) on its side facing the flywheel (1; 1a, b, e) and that the spring (53; 53a, b, e) is supported between the collar (49; 49a, b, e) and the pressure plate (11; 11a, b, e).

21. An arrangement in accordance with claim 20, characterized in that the spring is in the form of a conical spring (53; 53a, b) which encloses the sliding bolt (39: 39a, b), is supported with its end of smaller diameter against the collar (49; 49a, b) and, for generating a play compensation moment acting on the sliding bolt (39; 39a, b), is supported with its end of larger diameter in relation to the sliding bolt (39; 39a, b) radially offset towards the exterior on the pressure plate (11; 11a, b).

22. An arrangement in accordance with claim 21, characterized in that the pressure plate (11; 11a, b) has a blind bore (55; 55a, b), which is eccentric in respect to the opening (41; 41a, b) guiding the sliding bolt (39; 39a, b), for guiding of the end of the conical spring (53; 53a, b) of larger diameter.

23. An arrangement in accordance with claim 19, characterized in that each play transfer device (37c, e) has a sliding bolt (39c, e) disposed in an opening (41c, e) of the pressure plate (11c, e), and that the spring is a tension spring (53c, e) and, for generating a play compensation moment, is radially offset towards the exterior in respect to the sliding bolt (39c, e) on the pressure plate (11c, e) and on a part (43c, e) fastened on the end of the sliding bolt (39c, e) distant from the flywheel.

24. An arrangement in accordance with claim 19, characterized in that each play transfer device (37; 37a to c, e) has a sliding bolt (39; 39a to c, e), slidably guided in an opening (41; 41a to c, e) of the pressure plate (11; 11a to c, e), and that the sliding bolt (39; 39a to c, e) and/or the opening (41; 41a to c, e) include frictional force-increasing means.

25. An arrangement in accordance with claim 1, characterized in that the wear path compensation member comprises a ring (31) which is concentric to the rotational axis (3), is radially slit and is of wedge shape in cross section with a wider end closer to the axis of rotation and is guided radially and movable with radial internal stress acting in a direction to increase its diameter, on a cone-shaped inclined guide face of the pressure plate (11).

26. An arrangement in accordance with claim 25, characterized in that a support ring (67) is disposed between the cone-shaped ring (31a) and the diaphragm spring (13a) and is centered on the pressure plate (11a) by means of a plurality of centering pins (69) which are offset in respect to each other in the circumferential direction and are parallel to the axis of rotation (3).

* * * * *

UNITED STATES PATENT AND TRADEMARK OFFICE
CERTIFICATE OF CORRECTION

PATENT NO. : 5,377,803
DATED : January 3, 1995
INVENTOR(S) : Achim Link et al.

It is certified that error appears in the above-indentified patent and that said Letters Patent is hereby corrected as shown below:

<u>Col. 14, line 57</u>, "to" should read --to be--;
<u>Col. 14, line 60</u>, "and" should read --and a--.

Signed and Sealed this

Thirtieth Day of May, 1995

Attest:

BRUCE LEHMAN

Attesting Officer

Commissioner of Patents and Trademarks